United States Patent
Furumoto (10) Patent No.: US 9,378,737 B2
(45) Date of Patent: Jun. 28, 2016

(54) VOICE RECOGNITION DEVICE

(71) Applicant: Yuki Furumoto, Tokyo (JP)

(72) Inventor: Yuki Furumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/430,840

(22) PCT Filed: Nov. 5, 2012

(86) PCT No.: PCT/JP2012/078625
§ 371 (c)(1),
(2) Date: Mar. 24, 2015

(87) PCT Pub. No.: WO2014/068788
PCT Pub. Date: May 8, 2014

(65) Prior Publication Data
US 2015/0279363 A1    Oct. 1, 2015

(51) Int. Cl.
*G10L 15/32* (2013.01)
*G10L 15/20* (2006.01)
*G10L 15/02* (2006.01)
*G10L 15/22* (2006.01)
G10L 15/08 (2006.01)

(52) U.S. Cl.
CPC ............... *G10L 15/20* (2013.01); *G10L 15/02* (2013.01); *G10L 15/22* (2013.01); *G10L 15/32* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 7,418,392 B1* | 8/2008 | Mozer | ............... | G10L 15/26 315/307 |
| 9,190,059 B2* | 11/2015 | Lee | ............... | H04W 52/0254 |
| 9,275,637 B1* | 3/2016 | Salvador | ............... | G10L 15/01 |
| 2003/0120486 A1* | 6/2003 | Brittan | ............... | G10L 15/32 704/231 |
| 2011/0111805 A1 | 5/2011 | Paquier et al. | | |
| 2013/0151250 A1* | 6/2013 | VanBlon | ............... | G10L 15/30 704/235 |

FOREIGN PATENT DOCUMENTS

| | | |
|---|---|---|
| DE | 19533541 C1 | 3/1997 |
| JP | 6-35497 A | 10/1994 |
| JP | 7-13591 A | 1/1995 |
| JP | 2001-42894 A | 2/2001 |
| JP | 2003-140691 A | 5/2003 |
| JP | 2004-219728 A | 8/2004 |
| JP | 2004-354722 A | 12/2004 |
| JP | 3764302 B2 | 4/2006 |
| JP | 2006-215418 A | 8/2006 |
| JP | 2006-251298 A | 9/2006 |
| JP | 2010-78986 A | 4/2010 |

* cited by examiner

*Primary Examiner* — Abul Azad
(74) *Attorney, Agent, or Firm* — Birch, Stewart, Kolasch & Birch (57) ABSTRACT

Because a voice recognition device in accordance with the present invention is configured in such a way as to be able to accept an operation of commanding a voice recognition start also when recognizing an uttered voice at all times, the voice recognition device can recognize an uttered voice by using a voice recognition method having a high recognition rate according to an operation of commanding a voice recognition start when a speaking person desires while avoiding the inconvenience of usually needing to perform a specific operation every time when making the voice recognition device perform recognition. As a result, the convenience is improved.

8 Claims, 9 Drawing Sheets

VOICE RECOGNITION DEVICE

FIELD OF THE INVENTION

The present invention relates to a voice recognition device that recognizes an uttered voice.

BACKGROUND OF THE INVENTION

As a voice recognition method, a method of recognizing a voice uttered after a speaking person's operation of commanding a voice recognition start and a method of recognizing an uttered voice at all times without such an operation are known widely. A problem with the former method is that while the recognition rate becomes high because the starting end of an uttered voice is specified and therefore the detection of a section is facilitated, there is a necessity to perform a specific operation every time when recognition is performed and hence an inconvenience is imposed on the speaking person. On the other hand, a problem with the latter method is that because no specific operation is needed, the above-mentioned disadvantage is eliminated, but the recognition rate becomes low because it is difficult to detect a voice section.

Therefore, in order to solve these problems, for example, patent reference 1 discloses a voice recognition device that is provided with the above-mentioned two voice recognition methods, and that automatically switches to an appropriate one of the voice recognition methods according to a speaking person's state or a surrounding state. Concretely, when, for example, the surrounding noise is large, the voice recognition device switches to the former voice recognition method, whereas when the noise is small, switches to the latter voice recognition method.

RELATED ART DOCUMENT

Patent Reference

Patent reference 1: Japanese Unexamined Patent Application Publication No. 2001-42894

SUMMARY OF THE INVENTION

Problems to be Solved by the Invention

However, in a conventional voice recognition device disclosed in, for example, patent reference 1, when having switched to one of the voice recognition methods, the other voice recognition method cannot be used. A problem is therefore that even when, for example, a speaking person desires the voice recognition device to recognize a voice more certainly in a place where noise is small, the voice recognition device cannot use the former voice recognition method, and therefore the convenience for the speaking person is low.

The present invention is made in order to solve the above-mentioned problem, and it is therefore an object of the present invention to provide a voice recognition device that can accept an operation of commanding a voice recognition start which is performed by a speaking person also when recognizing an uttered voice at all times.

Means for Solving the Problem

In order to achieve the above-mentioned object, in accordance with the present invention, there is provided a voice recognition device that recognizes an uttered voice, the voice recognition device including: a voice acquirer that detects and acquires the above-mentioned uttered voice; a first voice recognizer that recognizes voice data acquired by the above-mentioned voice acquirer at all times even if the voice recognition device does not receive a voice recognition start command provided by a speaking person; a voice recognition start commander that outputs a command signal for starting voice recognition; a second voice recognizer that, when receiving the signal outputted by the above-mentioned voice recognition start commander, recognizes the voice data acquired by the above-mentioned voice acquirer; and a controller that acquires and outputs a recognition result provided by the above-mentioned first voice recognizer or the above-mentioned second voice recognizer, in which the above-mentioned controller acquires the recognition result provided by the above-mentioned first voice recognizer, and, when not receiving the signal outputted by the above-mentioned voice recognition start commander, outputs the recognition result provided by the above-mentioned first voice recognizer to a device to which the above-mentioned voice recognition device is applied, whereas when receiving the signal outputted by the above-mentioned voice recognition start commander, acquires the recognition result provided by the above-mentioned second voice recognizer, and outputs the recognition result provided by the above-mentioned second voice recognizer while giving a higher priority to the recognition result provided by the above-mentioned second voice recognizer than to the recognition result provided by the above-mentioned first voice recognizer.

Advantages of the Invention

Because the voice recognition device in accordance with the present invention can accept an operation of commanding a voice recognition start also when recognizing an uttered voice at all times, the voice recognition device can recognize an uttered voice by using a voice recognition method having a high recognition rate according to an operation of commanding a voice recognition start when a speaking person desires while avoiding the inconvenience of needing to perform a specific operation every time when making the voice recognition device perform recognition, thereby being able to improve the convenience.

EMBODIMENTS OF THE INVENTION

Hereafter, the preferred embodiments of the present invention will be explained in detail with reference to the drawings.

In accordance with the present invention, there is provided a voice recognition device that recognizes an uttered voice, and, when this voice recognition device is active, recognizes a voice at all times and also accepts an operation of commanding a voice recognition start which is performed by a speaking person. Although an explanation will be made in the following embodiments by taking, as an example, a case in which the voice recognition device in accordance with the present invention is applied to a navigation device mounted in a moving object such as a vehicle, the voice recognition device can also be applied to a navigation system or the like which is installed in a smart phone, a tablet PC, a mobile phone, and so on.

Embodiment 1

Figure 1:
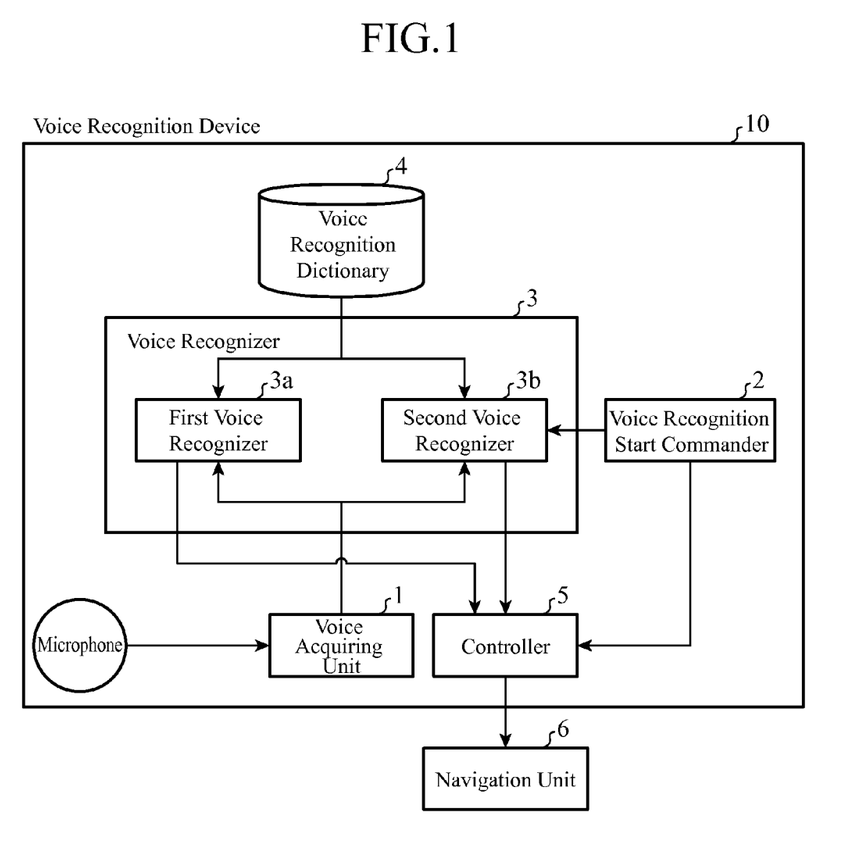
FIG. 1 is a block diagram showing an example of a voice recognition device in accordance with Embodiment 1.

FIG. 1 is a block diagram showing an example of a voice recognition device in accordance with Embodiment 1 of the present invention. This voice recognition device 10 includes a voice acquiring unit 1, a voice recognition start commander 2, a voice recognizer 3, a voice recognition dictionary 4, and a controller 5. Further, this voice recognition device 10 is applied to a navigation device equipped with a navigation unit 6.

The voice acquiring unit 1 captures an utterance collected by a microphone, i.e., an inputted voice, and A/D (Analog/Digital) converts this voice by using, for example, PCM (Pulse Code Modulation).

The voice recognition start commander 2 is, for example, an operation unit, such as icons displayed on a touch panel, or buttons or a remote control placed on a steering wheel or in a navigation system, and, when pushed down by a speaking person, this voice recognition start commander 2 outputs a signal for commanding a start of a voice recognition process to a second voice recognizer 3b which will be mentioned later. The voice recognition start commander 2 also outputs a signal showing that the voice recognition start commander 2 has been pushed down to the controller 5 which will be mentioned later.

The voice recognizer 3 is comprised of a first voice recognizer 3a and the second voice recognizer 3b, detects a voice section corresponding to an uttered content from the voice signal digitized by the voice acquiring unit 1, extracts a feature quantity of voice data about this voice section, performs a recognition process on the basis of the feature quantity and by using the voice recognition dictionary 4, and outputs a character string which is a voice recognition result. The recognition process can be performed by using, for example, a typical method such as an HMM (Hidden Markov Model) method.

In this case, the first voice recognizer 3a recognizes a content uttered by a speaking person at all times even if the voice recognition device does not receive a voice recognition start command provided by a speaking person. More specifically, the first voice recognizer 3a performs the above-mentioned recognition process on the voice data acquired by the voice acquiring unit 1 at all times even if the first voice recognizer does not receive a voice recognition start command signal outputted by the voice recognition start commander 2. In contrast, when the voice recognition start commander 2 is pushed down by a speaking person, and the second voice recognizer 3b receives a voice recognition start signal outputted by the voice recognition start commander 2, the second voice recognizer 3b is triggered by this signal and recognizes the voice data acquired by the voice acquiring unit 1.

It is seen from a comparison between the recognition result provided by this first voice recognizer 3a and the recognition result provided by the second voice recognizer 3b that the recognition result provided by the first voice recognizer 3a that performs recognition at all times does not have so high accuracy as the recognition result provided by the second voice recognizer 3b. However, because the first voice recognizer performs voice recognition at all times even if the voice recognition device does not receive a voice recognition start command provided by a speaking person, a great convenience is provided.

In contrast, because the second voice recognizer 3b starts voice recognition when triggered by a voice recognition start command provided by a speaking person, and therefore the point where the voice recognition is started becomes clear, the voice recognition accuracy of the recognition result provided by the second voice recognizer 3b is improved. However, the second voice recognizer certainly requires a speaking person's operation using the voice recognition start commander 2.

The voice recognition dictionary 4 stores words each of which is used to perform a comparison with the feature quantity of the voice data at the time when the voice recognizer 3 (the first voice recognizer 3a and the second voice recognizer 3b) performs voice recognition, and each of which can be extracted.

The controller 5 acquires the results recognized by the voice recognizer 3 (the first voice recognizer 3a and the second voice recognizer 3b), determines whether or not to output each of the recognition results, and outputs each of the recognition results to the navigation unit 6 (device to which the voice recognition device 10 is applied) which will be mentioned later. At this time, although the controller 5 basically outputs the recognition result character string recognized by the first voice recognizer 3a, the controller outputs the recognition result character string recognized by the second voice recognizer 3b while giving a higher priority to the recognition result character string recognized by the second voice recognizer 3b than to the recognition result character string recognized by the first voice recognizer 3a when a signal is outputted by the voice recognition start commander 2.

The navigation unit 6 performs a facility search by using the recognition result character string outputted by the controller 5, displays the recognition result on a screen, and performs a function corresponding to the recognition result character string. The navigation unit 6 has basic functions which a typical navigation device has, and also has a display unit for producing a screen display of the recognition result, though the illustration of the display unit is omitted.

Figure 2:
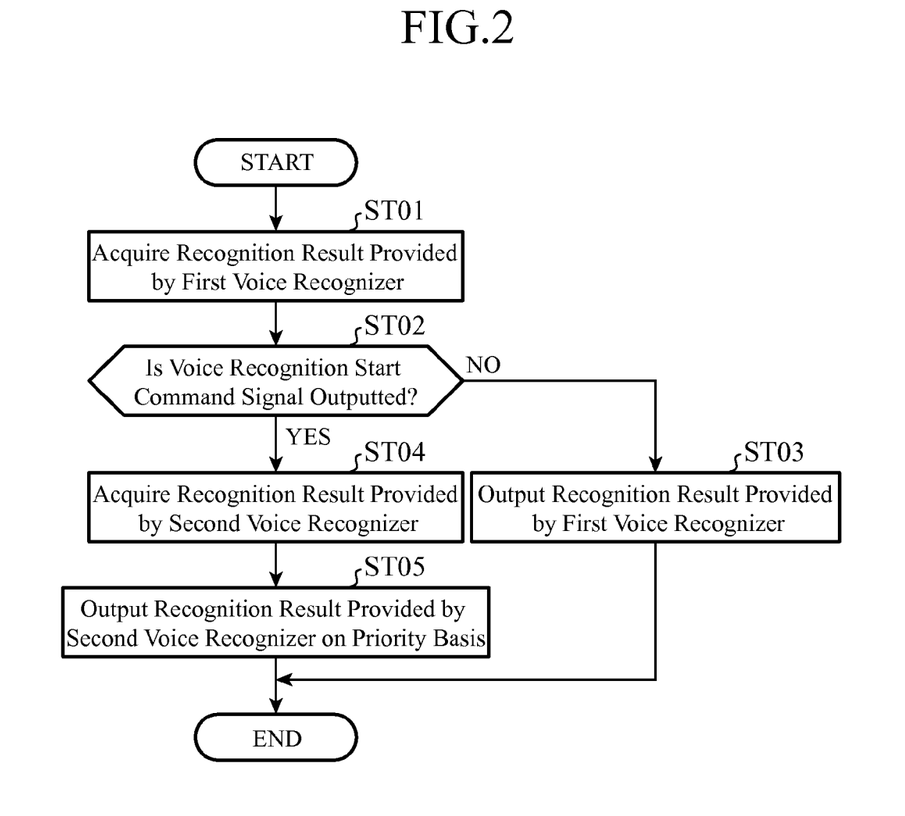
FIG. 2 is a flow chart showing a process performed by the voice recognition device in accordance with Embodiment 1.

Next, the operation of the voice recognition device in accordance with Embodiment 1 will be explained by using a flow chart shown in FIG. 2.

First, the controller 5 acquires the recognition result provided by the first voice recognizer 3a (step ST01). The first voice recognizer 3a recognizes an uttered voice at all times while the voice recognition device 10 is active, as mentioned above, and the controller 5 basically acquires the recognition result from the first voice recognizer 3a accordingly even if the controller does not receive any command.

Next, the controller 5 determines whether or not a voice recognition start signal by the voice recognition start commander 2 is outputted (step ST02). When this signal is not outputted and the controller does not receive this signal (when NO in step ST02), the controller outputs the recognition result provided by the first voice recognizer 3a acquired in step ST01 (step ST03). In contrast, when a voice recognition start signal is outputted and the controller receives this signal (when YES in step ST02), the controller acquires the recognition result provided by the second voice recognizer 3b (step ST04), and outputs, instead of the recognition result provided by the first voice recognizer 3a acquired in step ST01, the recognition result provided by the second voice recognizer 3b acquired in step ST04 on a priority basis (step ST05).

Because the voice recognition device that basically recognizes and outputs an uttered voice at all times by using the first voice recognizer 3a is configured in such a way as to, only when the voice recognition start commander 2 is pushed down, be able to allow the output of the recognition result provided by the second voice recognizer 3b to be cut into the process and output this recognition result on a priority basis, as mentioned above, when, for example, the speaking person is located in a place having small noise or the like and desires to cause the voice recognition device to recognize a voice more certainly, the speaking person is enabled to cause the voice recognition device to output a voice recognition result having a high recognition rate by pushing down the voice recognition start commander 2.

Because the voice recognition device is configured in such a way as to, also when the voice recognition device recognizes an uttered voice at all times, accept an operation of commanding a voice recognition start, and output a voice recognition result having a high degree of accuracy, which is acquired in response to the voice recognition start command, on a priority basis, as mentioned above, the speaking person is enabled to cause the voice recognition device to recognize an uttered voice by using a voice recognition method having a high recognition rate according to an operation of commanding a voice recognition start when the speaking person desires while avoiding the inconvenience of usually needing to perform a specific operation every time when making the voice recognition device perform recognition. As a result, the convenience is improved.

Although the explanation of the voice recognition dictionary 4 is made by assuming that the first voice recognizer 3a and the second voice recognizer 3b use the same dictionary, it can be assumed that the voice recognizers use different voice recognition dictionaries. For example, the dictionary used by the second voice recognizer 3b is assumed to store only words, such as "next", "Nth row", and "previous page", each of which is used to select a displayed list item. More specifically, the words to be recognized can be limited as compared with those stored in the voice recognition dictionary used by the first voice recognizer 3a.

By making the voice recognition dictionaries be different from each other in this way, the recognition rate is further improved when a speaking person pushes down the voice recognition start commander 2 and then utters. Therefore, the convenience is further improved when, for example, a speaking person especially desires that the voice recognition device does not fail in recognition.

Embodiment 2

Figure 3:
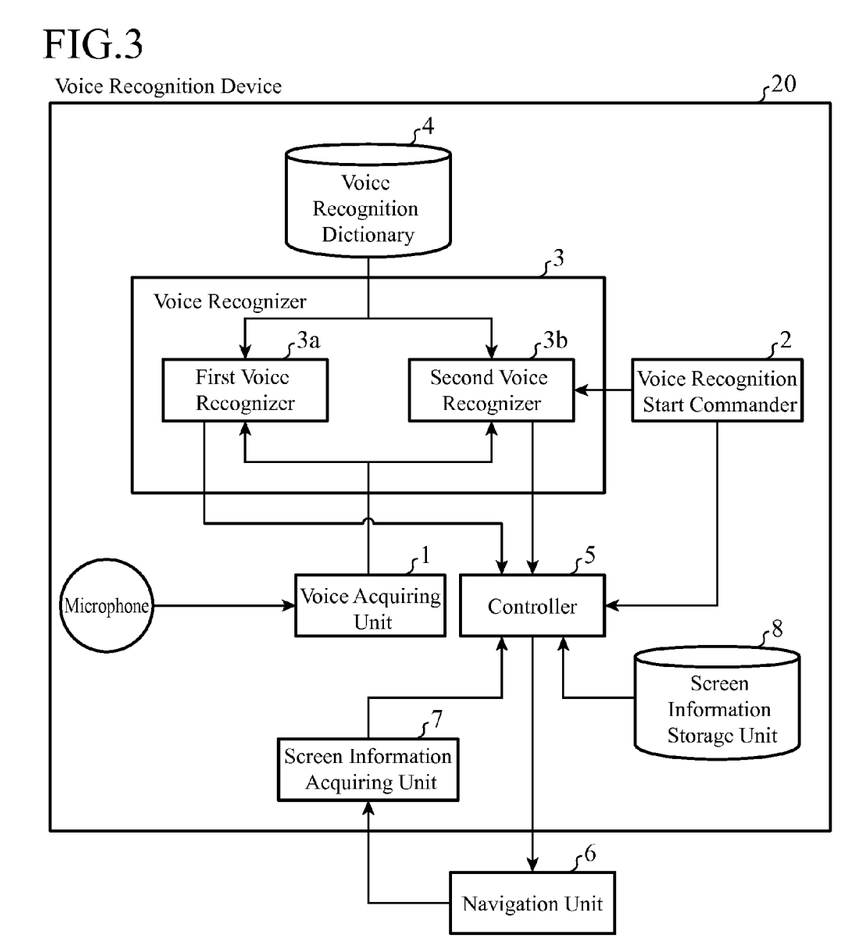
FIG. 3 is a block diagram showing an example of a voice recognition device in accordance with Embodiment 2.

FIG. 3 is a block diagram showing an example of a voice recognition device in accordance with Embodiment 2 of the present invention. The same structural components as those explained in Embodiment 1 are designated by the same reference numerals, and the duplicated explanation of the components will be omitted hereafter. The voice recognition device 20 in accordance with Embodiment 2 shown hereafter further includes a screen information acquiring unit (surrounding state acquirer) 7 and a screen information storage unit 8 as compared with the voice recognition device 10 in accordance with Embodiment 1. Further, the operation of a controller 5 differs from that in accordance with Embodiment 1, and is the one which will be mentioned later.

The screen information acquiring unit (surrounding state acquirer) 7 acquires type information (e.g., an ID assigned on a per screen basis, a screen name, or the like, and this type information indicates the same hereafter) of a screen currently being displayed on a display unit of a navigation unit 6 (display of a device to which the voice recognition device 20 is applied).

Figure 4:
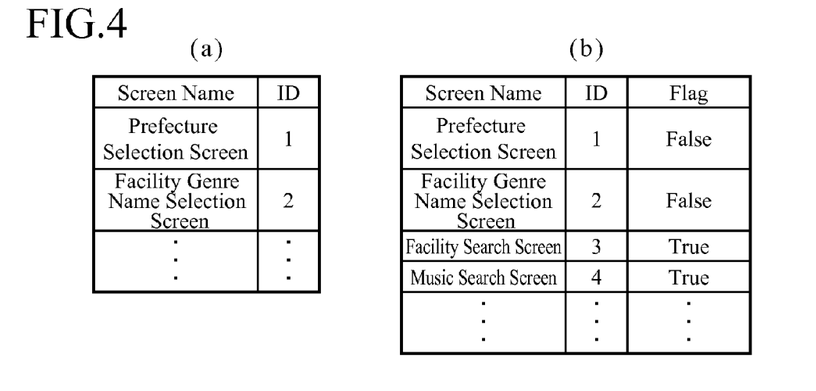
FIG. 4 is a table storing information about the types of screens.

The screen information storage unit 8 stores the pieces of type information of screens to be displayed on the display unit of the navigation unit 6, on each of which the need for the prevention of a failure in voice recognition is imposed, as shown in FIG. 4(a). More specifically, the screen information storage unit stores the pieces of type information of screens each of which indicates that the screen is a one to which a type causing the adoption of a recognition result provided by a second voice recognizer 3b is assigned, and each of which is determined not to output a recognition result provided by a first voice recognizer 3a.

The controller 5 in the voice recognition device 20 in accordance with this Embodiment 2 then searches through the screen information storage unit 8 by using, as a search key, the screen information acquired by the screen information acquiring unit 7. Then, when the screen type information matching the search key exists in the screen information storage unit 8, the controller determines not to output the recognition result provided by the first voice recognizer 3a to the navigation unit 6 (device to which the voice recognition device 20 is applied), whereas when no screen type information matching the search key exists, the controller outputs the recognition result provided by the first voice recognizer 3a as usual. More specifically, when determining that the screen currently being displayed is a one to which a type causing the adoption of the recognition result provided by the second voice recognizer 3b is assigned on the basis of the screen type information acquired by the screen information acquiring unit (surrounding information acquirer) 7, the controller 5 does not output the recognition result provided by the first voice recognizer 3a.

Concretely, when, for example, a main screen, a facility search screen, a music search screen, or the like is displayed on the display unit, voice recognition should just be performed by the first voice recognizer 3a that performs voice recognition at all times and a recognition result should just be outputted, as usual. In contrast, when a menu screen, a list selection screen, or the like on which the need for the prevention of a failure in recognition is especially imposed is displayed on the display unit, the controller prevents the recognition result provided by the first voice recognizer 3a from being outputted because it is desirable to use the recognition result provided by the second voice recognizer 3b that performs voice recognition with a high degree of accuracy in response to a command from a voice recognition start commander 2.

More specifically, a type causing the adoption of the recognition result provided by the second voice recognizer 3b is assigned to a screen, such as a menu screen, or a list selection screen, on which the need for the prevention of a failure in recognition is especially imposed, and, when the screen currently being displayed on the display unit of the navigation unit 6 (display unit of the device to which the voice recognition device 20 is applied) is one of those screens including the menu screen and the list selection screen, the controller 5 can determine that the screen currently being displayed is a one to which a type causing the adoption of the recognition result provided by the second voice recognizer 3b is assigned on the basis of the type information of the screen currently being displayed.

Figure 5:
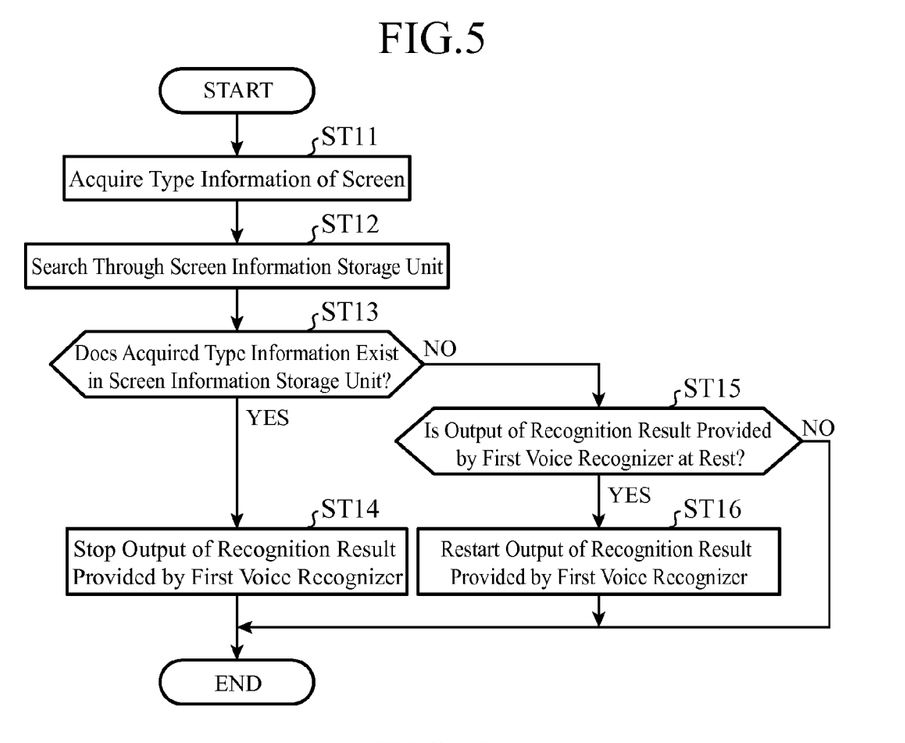
FIG. 5 is a flow chart showing a process performed by the voice recognition device in accordance with Embodiment 2.

Next, the operation of the voice recognition device in accordance with Embodiment 2 will be explained by using a flow chart shown in FIG. 5.

First, when receiving a notification indicating that the screen currently being displayed on the display unit is changed from the navigation unit 6, the screen information acquiring unit (surrounding state acquirer) 7 acquires the type information of the screen currently been displayed (step ST11). The controller 5 then searches through the screen information storage unit 8 by using, as a search key, the type information acquired by the screen information acquiring unit 7 (step ST12).

When the screen type information acquired in step ST11 exists in the pieces of screen type information stored in the screen information storage unit 8 (when YES in step ST13), the controller 5 does not output the recognition result provided by the first voice recognizer 3a (step ST14). In contrast, when the above-mentioned screen type information does not exist (when NO in step ST13) and the output of the recognition result provided by the first voice recognizer 3a is at rest (when YES in step ST15), the controller 5 restarts the output of the recognition result provided by the first voice recognizer 3a (step ST16). Further, when the acquired screen type information does not exist in the screen information storage unit 8 (when NO in step ST13) and the output of the recognition result provided by the first voice recognizer 3a is not at rest (when NO in step ST15), the controller ends the process without doing anything and performs usual voice recognition and a usual outputting process.

The screen information storage unit 8 can be configured in such a way as to store screen types and flags each showing whether or not to output the recognition result provided by the first voice recognizer 3a while bringing each of the screen types into correspondence with a flag, as shown in FIG. 4(b), and the controller 5 can be configured in such a way as to search through the screen information storage using 8 by using, as a search key, the screen type information acquired by the screen information acquiring unit 7, and, when the flag corresponding to the screen type information matching the search key is False, stop the output of the recognition result provided by the first voice recognizer 3a (process of step ST14), whereas when the flag is True, restart the output (processes of steps ST15 and ST16).

As an alternative, the screen information storage unit can be configured in such a way as to exclude either one of the screen names and the IDs in the examples shown in FIGS. 4(a) and 4(b).

Figure 6:
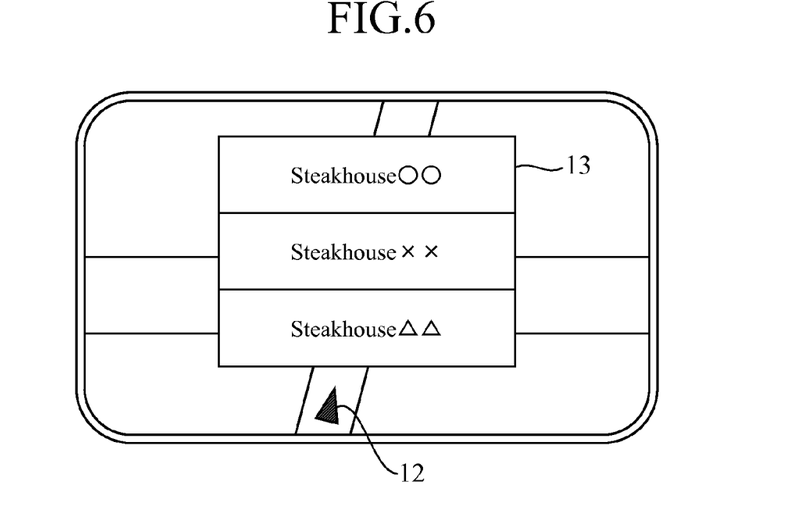
FIG. 6 is a diagram showing an example of a screen in which a namelist is displayed on a display of a navigation unit.

Further, the controller can be configured in such a way as to determine whether or not to output the recognition result provided by the first voice recognizer 3a on the basis of the type of a display piece superimposed and displayed in the screen displayed on the display unit. In this case, the above-mentioned display piece superimposed and displayed is, for example, a namelist 13 for presenting a result of having performed a facility search, or the like, as shown in FIG. 6. FIG. 6 is an example of a navigation screen displayed on the display unit of the navigation unit 6.

The example of FIG. 6 is in a state in which the namelist 13 of steakhouses is superimposed and displayed, as a result of having performed, for example, a search for restaurants or steakhouses, in a typical navigation screen in which a vehicle mark 12 showing the position of a vehicle is displayed on a map, and the voice recognition device waits for a selection made by a speaking person. Also when a display of the namelist 13 is produced in this way as a display piece in a state in which a speaking person should make a certain selection, the voice recognition device controls in such a way as not to output the recognition result provided by the first voice recognizer 3b because it is desirable to prevent a failure in voice recognition.

Further, although the example of determining whether or not to output the recognition result provided by the first voice recognizer 3a on the basis of the type information of the screen displayed on the display unit of the navigation unit 6 is explained in this Embodiment 2, whether or not to output the recognition result provided by the first voice recognizer 3a can be determined alternatively on the basis of the type information of a function currently being performed by the navigation unit 6. More specifically, when determining that the function is a function to which a type causing the adoption of the recognition result provided by the second voice recognizer 3b is assigned, the controller 5 does not output the recognition result provided by the first voice recognizer.

For example, when the function currently being performed is an address search, because an address has little ambiguity and is a target which needs to be recognized certainly, like a candidate which is selected from a list, and it is hence desirable to prevent a failure in voice recognition, a type causing the adoption of the recognition result provided by the second voice recognizer 3b is assigned to the address search function, and the controller 5 determines that the function currently being performed is a function to which a type causing the adoption of the recognition result provided by the second voice recognizer 3b is assigned on the basis of the type information of the function, and then controls in such a way as not to output the recognition result provided by the first voice recognizer 3a. In this case, the screen information acquiring unit 7 in the block diagram shown in FIG. 5 is a function information acquiring unit (surrounding state acquirer) that is configured in such a way as to acquire the type information of the function currently being performed from the navigation unit 6, and the screen information storage unit 8 is a function information storage unit that is configured in such away as to store pieces of function type information. Then, the voice recognition device should just search through the function information storage unit by using, as a search key, the type information of the function by means of the controller 5.

As mentioned above, because the voice recognition device is configured in such a way as to stop and restart the output of the recognition result provided by the first voice recognizer that performs voice recognition at all times according to the screen currently being displayed or the function currently being performed on the device to which the voice recognition device is applied, the voice recognition device reduces the frequency of misrecognition by enabling a speaking person to push down the voice recognition start commander 2 and then utter in, for example, a situation in which the speaking person especially desires that the voice recognition device does not fail in recognition, such as a situation in which the speaking person selects a list item in a list screen in which search results are displayed. Further, the voice recognition device prevents a result of having performed misrecognition or erroneous detection from being displayed as a result of having performed voice recognition at all times, and also prevents itself from operating on the basis of the result of having performed misrecognition or erroneous detection. As a result, the convenience is improved.

Embodiment 3

Figure 7:
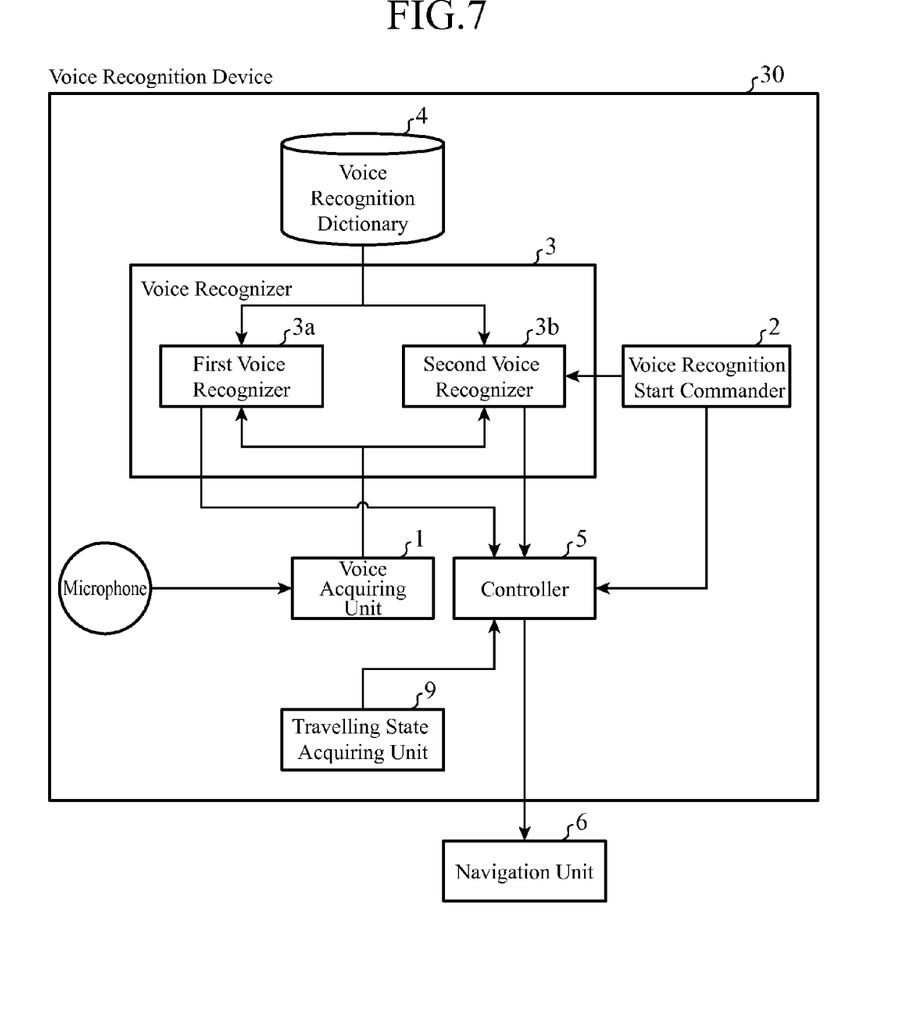
FIG. 7 is a block diagram showing an example of a voice recognition device in accordance with Embodiment 3.

FIG. 7 is a block diagram showing an example of a voice recognition device in accordance with Embodiment 3 of the present invention. The same structural components as those explained in Embodiment 1 are designated by the same reference numerals, and the duplicated explanation of the components will be omitted hereafter. Furthermore, the voice recognition device 30 in accordance with Embodiment 3 shown hereafter includes a travelling state acquiring unit (surrounding state acquirer) 9 as compared with the voice recognition device 10 in accordance with Embodiment 1. Further, the operation of a controller 5 differs from that in accordance with Embodiment 1, and is the one which will be mentioned later.

The travelling state acquiring unit (surrounding state acquirer) 9 acquires the travelling state of a moving object in which the voice recognition device 30 is installed, for example, information indicating whether or not the moving object is at rest, a traveling speed, the number of rotations of an engine, or the like.

The controller 5 of the voice recognition device 30 in accordance with this Embodiment 3 then determines whether or not to output a recognition result provided by a first voice recognizer 3a according to the travelling state acquired by the travelling state acquiring unit 9.

Concretely, the controller 5 does not output the recognition result provided by the first voice recognizer 3a when determining that the moving object is accelerating or moving at a high speed on the basis of the travelling state of the above-mentioned moving object. For example, when it is expected that the noise is small, such as when the vehicle is at rest, the controller should just output the recognition result provided by the first voice recognizer 3a that performs recognition at all times, while when it is expected that the noise is large and hence the recognition rate becomes lower, such as when the vehicle is accelerating or moving at a high speed, the controller prevents the recognition result provided by the first voice recognizer 3a from being outputted because it is desirable to use a recognition result provided by a second voice recognizer 3b that performs voice recognition with a high degree of accuracy in response to a command from a voice recognition start commander 2.

Figure 8:
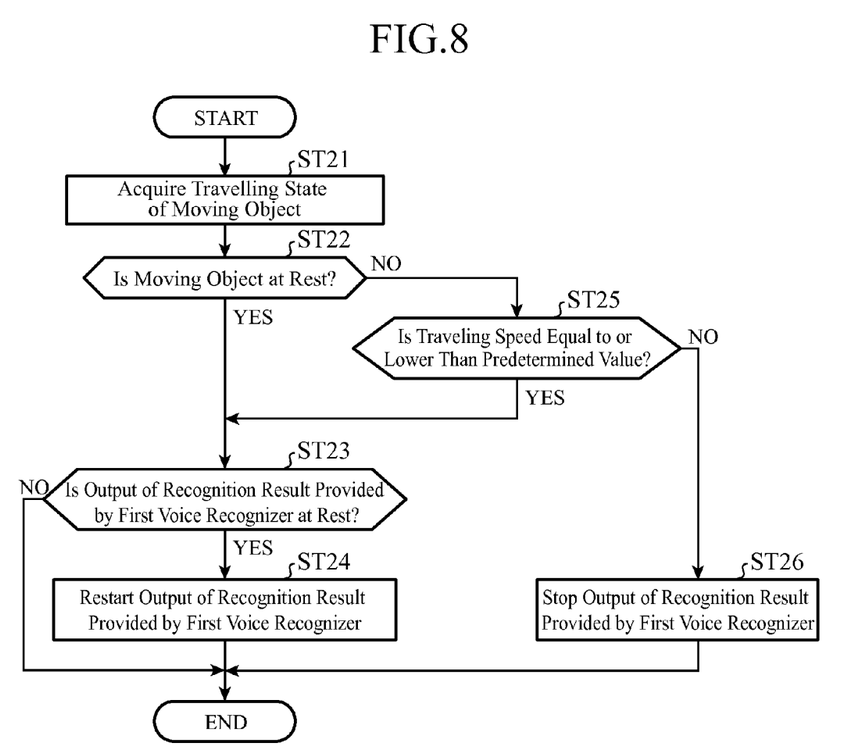
FIG. 8 is a flow chart showing a process performed by the voice recognition device in accordance with Embodiment 3.

Next, the operation of the voice recognition device in accordance with Embodiment 3 will be explained by using a flow chart shown in FIG. 8.

First, the travelling state acquiring unit (surrounding state acquirer) 9 acquires the travelling state of the moving object, such as the speed of the vehicle (moving object), a steering state, a parking state, a brake state, or the number of rotations of the engine, from, for example, a CAN (Controller Area Network) signal or the like (step ST21). Next, the controller 5 determines whether the moving object is travelling or at rest on the basis of the information acquired by the travelling state acquiring unit 9 (travelling state of the moving object) (step ST22).

Then, when the moving object is determined to be at rest (when YES in step ST22) and the output of the recognition result provided by the first voice recognizer 3a is at rest (when YES in step ST23), the controller restarts the output of the recognition result provided by the first voice recognizer 3a (step ST24). In contrast, when the output of the recognition result provided by the first voice recognizer 3a is not at rest in step ST23 (when NO in step ST23), the controller ends the process without doing anything and performs usual voice recognition and a usual outputting process.

In contrast, when the moving object is determined to be travelling (when NO in step ST22) and the traveling speed is equal to or lower than a predetermined value (or the traveling speed is lower than the predetermined value) (when YES in step ST25), the controller performs processes of step ST23 and subsequent steps. Further, when the traveling speed is higher than the predetermined value (or the traveling speed is equal to or higher than the predetermined value) in step ST25 (when NO in step ST25), the controller does not output the recognition result provided by the first voice recognizer 3a (step ST26).

As mentioned above, because the voice recognition device is configured in such a way as to stop and restart the output of the recognition result provided by the first voice recognizer that performs voice recognition at all times according to the travelling state of the moving object, the voice recognition device can prevent misrecognition from occurring when it is expected that the noise is large, such as when the moving object is accelerating or moving at a high speed, while the voice recognition device can recognize a voice without causing a speaking person to perform a specific operation when it is expected that the noise is small, such as when the moving object is at rest. As a result, the inconvenience can be obviated, and the convenience is improved.

The example of not outputting the recognition result provided by the first voice recognizer 3a when the traveling speed is higher than the predetermined value (or the traveling speed is equal to or higher than the predetermined value) is explained in this Embodiment 3. In contrast to this, the controller can stop the output of the recognition result provided by the first voice recognizer 3a when the moving object is at rest, and can restart the output of the above-mentioned recognition result when the traveling speed is higher than the predetermined value (or the traveling speed is equal to or higher than the predetermined value). This is because it is dangerous for, for example, a beginner driver or the like to operate a button or the like while the moving object is travelling, and it is therefore preferable to adopt the recognition result provided by the second voice recognizer 3b in response to an operation of pushing down the voice recognition start commander 2 when the moving object is at rest, and output the recognition result provided by the first voice recognizer 3a that performs recognition at all times while the moving object is travelling.

Further, in order to prevent the stop and restart of the output of the recognition result provided by the first voice recognizer 3a from being repeated in a short time due to variations in the traveling speed in the vicinity of the predetermined value, a predetermined value at which to restart the output of the recognition result provided by the first voice recognizer 3a can be set to differ from another predetermined value at which to stop the output of the recognition result. Concretely, a hysteresis is provided between the predetermined values by, for example, setting the predetermined value at which to stop the output of the recognition result to 60 km/h, and setting the other predetermined value at which to restart the output of the recognition result to 70 km/h. As a result, a phenomenon in which the stop and restart of the output of the recognition result are repeated frequently can be prevented from occurring even if the traveling speed varies slightly in the vicinity of each of the predetermined values.

Embodiment 4

Figure 9:
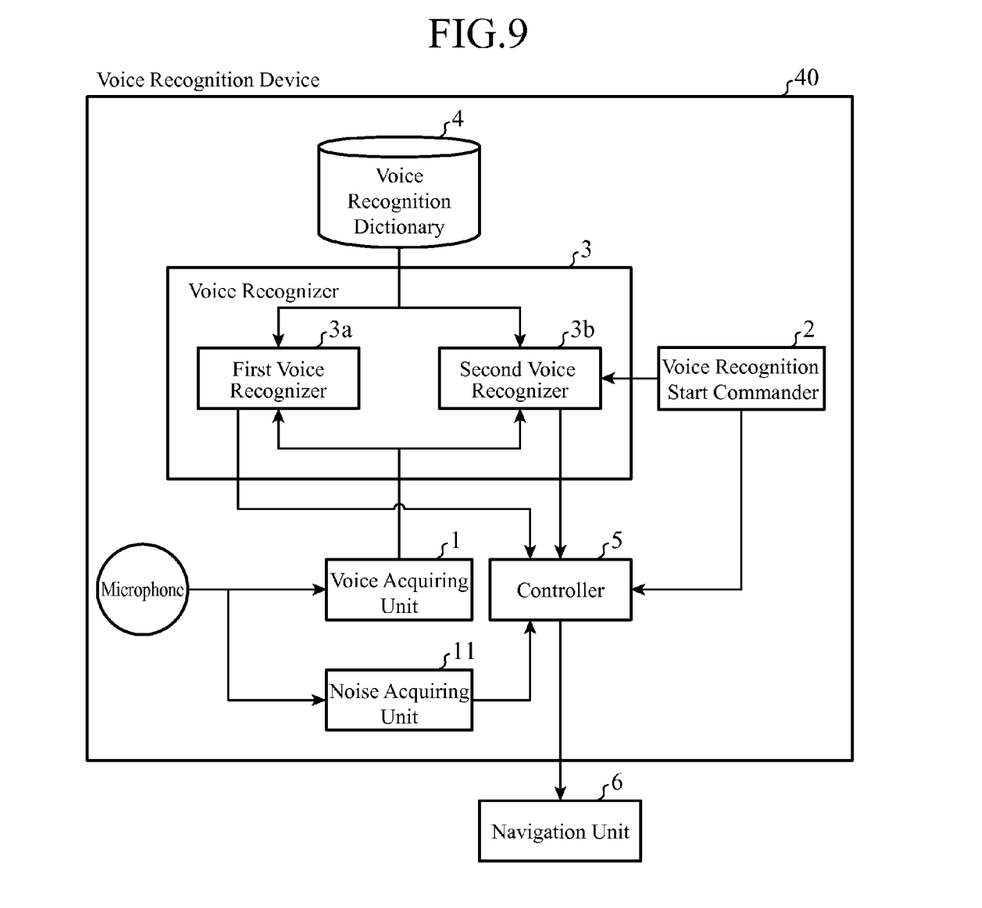
FIG. 9 is a block diagram showing an example of a voice recognition device in accordance with Embodiment 4.

FIG. 9 is a block diagram showing an example of a voice recognition device in accordance with Embodiment 4 of the present invention. The same structural components as those explained in Embodiment 1 are designated by the same reference numerals, and the duplicated explanation of the components will be omitted hereafter. The voice recognition device 40 in accordance with Embodiment 4 shown hereafter further includes a noise acquiring unit (surrounding state acquirer) 11 as compared with the voice recognition device 10 in accordance with Embodiment 1. Further, the operation of a controller 5 differs from that in accordance with Embodiment 1, and is the one which will be mentioned later.

The noise acquiring unit (surrounding state acquirer) 11 analyzes a sound collected by a microphone, and calculates and outputs the sound volume of noise. More specifically, the noise acquiring unit acquires the sound volume of noise occurring in the surroundings of the voice recognition device 40.

Then, the controller 5 of the voice recognition device 40 in accordance with this Embodiment 4 stops and restarts the output of a recognition result provided by a first voice recognizer 3a according to the noise sound volume acquired by the noise acquiring unit 11.

Concretely, the controller 5 does not output the recognition result provided by the first voice recognizer 3a when the noise sound volume is equal to or larger than a predetermined value. For example, when the noise is small, the controller should just output the recognition result provided by the first voice recognizer 3a that performs recognition at all times, while when it is expected that the noise is large and hence the recognition rate becomes lower, the controller prevents the recognition result provided by the first voice recognizer 3a from being outputted because it is desirable to use a recognition result provided by a second voice recognizer 3b that performs voice recognition with a high degree of accuracy in response to a command from a voice recognition start commander 2.

Figure 10:
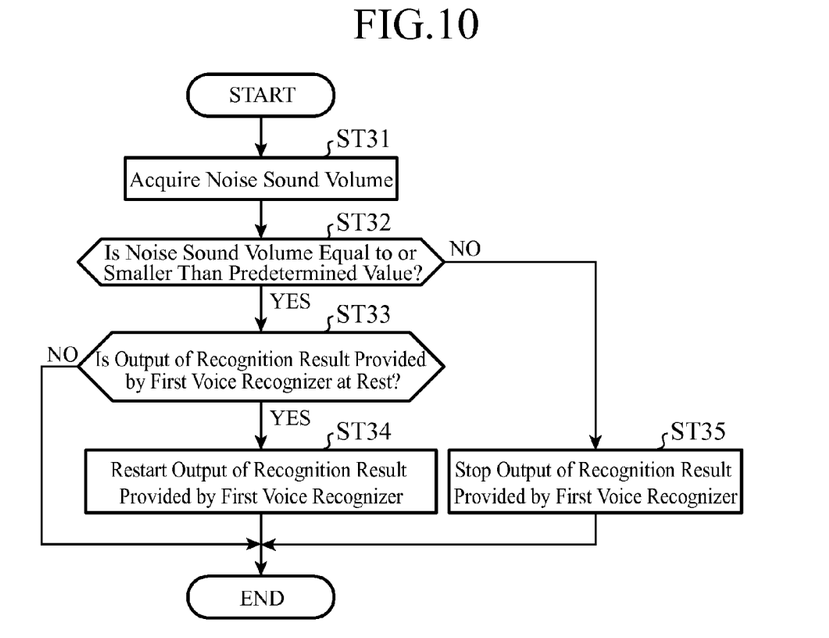
FIG. 10 is a flow chart showing a process performed by the voice recognition device in accordance with Embodiment 4.

Next, the operation of the voice recognition device in accordance with Embodiment 4 will be explained by using a flow chart shown in FIG. 10.

First, the noise acquiring unit (surrounding state acquirer) 11 analyzes the sound collected by the microphone and calculates the sound volume of noise (step ST31). Next, when the noise sound volume calculated by the noise acquiring unit 11 is equal to or smaller than the predetermined value (or the noise sound volume is smaller than the predetermined value) (when YES in step ST32), and the output of the recognition result provided by the first voice recognizer 3a is at rest (when YES in step ST33), the controller 5 restarts the process of outputting the recognition result provided by the first voice recognizer 3a (step ST34). In contrast, when the output of the recognition result provided by the first voice recognizer 3a is not at rest (when NO in step ST33), the controller ends the process without doing anything and performs usual voice recognition and a usual outputting process.

In contrast, when the noise sound volume calculated by the noise acquiring unit 11 is larger than the predetermined value (or the noise sound volume is equal to or larger than the predetermined value) (when NO in step ST32), the controller does not output the recognition result provided by the first voice recognizer 3a (step ST35).

In this case, when the noise sound volume becomes larger than the predetermined value (or the noise sound volume becomes equal to or larger than the predetermined value) while a speaking person is uttering, the controller can prevent the output of the recognition result provided by the first voice recognizer 3a from being stopped until the output of the recognition result provided by the first voice recognizer 3a is completed about the uttered voice.

Although in accordance with this Embodiment 4 the noise sound volume is determined from the sound collected by the microphone, the noise sound volume can be alternatively determined on the basis of the number of rotations of the engine from the travelling state acquiring unit 9 in accordance with Embodiment 3.

Concretely, numbers of rotations of the engine and noise sound volumes respectively corresponding to these numbers of rotations are stored in the noise acquiring unit 11 while the numbers of rotations and the noise sound volumes are brought into correspondence with each other. The noise acquiring unit 11 acquires the number of rotations of the engine from the travelling state acquiring unit 9 which has acquired the number of rotations of the engine from a CAN signal or the like, and determines the noise sound volume corresponding to the above-mentioned acquired number of rotations.

The controller 5 then determines whether or not to output the recognition result provided by the first voice recognizer 3a by determining whether or not the above-mentioned noise sound volume is equal to or smaller than the predetermined value (or the noise sound volume is smaller than the predetermined value).

Further, like in the case of Embodiment 3, by, for example, setting a predetermined value at which to restart the output of the recognition result provided by the first voice recognizer 3a and another predetermined value at which to stop the output to be different values, a hysteresis can be provided between the predetermined values.

In addition, the noise acquiring unit 11 can acquire the type of the road along which a moving object is travelling from map data via a navigation unit 6, and determine whether or not to output the recognition result provided by the first voice recognizer 3a on the basis of the above-mentioned road type. Concretely, when the acquired road type is a "road in a tunnel", a control operation of determining that noise easily occurs and preventing the recognition result provided by the first voice recognizer 3a from being outputted, or the like can be provided.

As mentioned above, because the voice recognition device is configured in such a way to stop and restart the output of the recognition result provided by the first voice recognizer that performs voice recognition at all times according to the sound volume of noise occurring in the surroundings of the voice recognition device, the voice recognition device can prevent misrecognition from occurring when the noise is large, while the voice recognition device can recognize a voice without causing a speaking person to perform a specific operation when the noise is small. As a result, the inconvenience can be obviated, and the convenience is improved.

Figure 11:
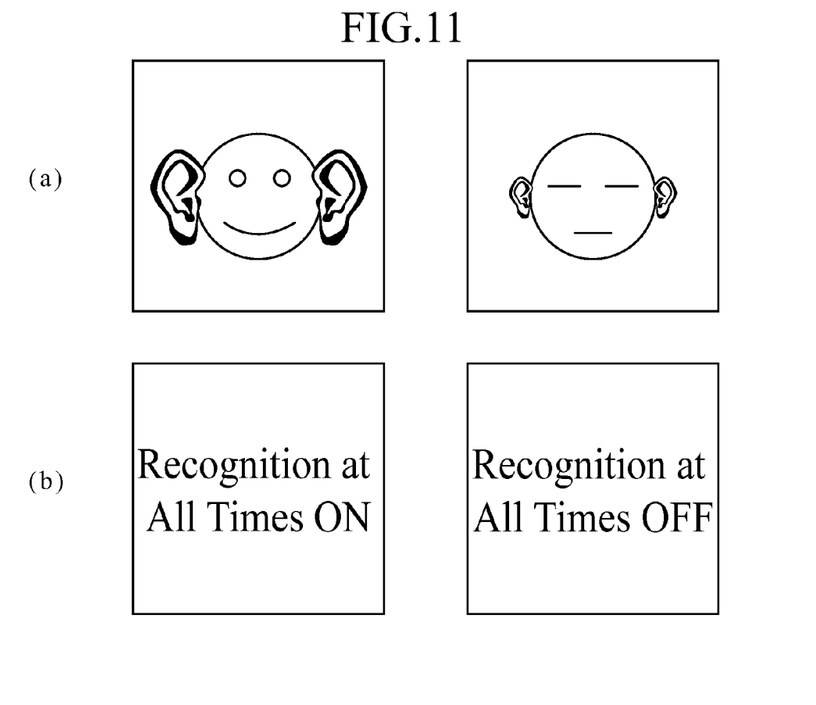
FIG. 11 is a diagram showing an example of a picture, characters, or the like specifying whether or not the voice recognition device is in a state in which the voice recognition device performs output of a recognition result provided by a first voice recognizer that performs voice recognition at all times.
Figure 12:
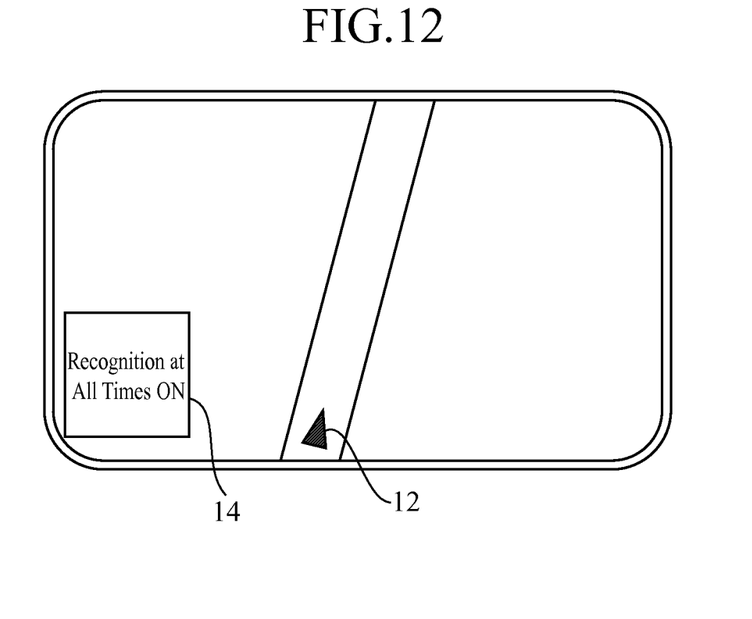
FIG. 12 is a diagram showing an example in which a picture, characters, as shown in FIG. 11, or the like are displayed on a typical navigation screen.

In above-mentioned Embodiments 2 to 4, a picture, characters, or the like (refer to FIG. 11(a) or 11(b)) showing whether or not the output of the recognition result provided by the first voice recognizer 3a is performed can be displayed on the display unit of the navigation unit 6, as shown in FIG. 12. FIG. 11 shows examples of a picture, characters, or the like specifying whether or not the voice recognition device is in a state in which the voice recognition device performs the output of the recognition result provided by the first voice recognizer 3a that performs voice recognition at all times. FIG. 11(a) shows an example of showing the state by using a picture, and FIG. 11(b) shows an example of showing the state by using characters. In both of FIGS. 11(a) and 11(b), a left-hand side shows that the voice recognition device is in the state in which the voice recognition device performs the output of the recognition result provided by the first voice recognizer 3a, and a right-hand side shows that the voice recognition device is a state in which the output of the recognition result provided by the first voice recognizer 3a is at rest. As an alternative, the state can be specified by using a symbol or the like.

FIG. 12 shows an example in which a picture, characters, or the like 14, as shown in FIG. 11, showing whether or not the voice recognition device is in the state in which the voice recognition device performs the output of the recognition result provided by the first voice recognizer 3a is displayed in a typical navigation screen in which a vehicle mark 12 showing the position of the vehicle is displayed on a map. When the voice recognition device is currently in the state in which the voice recognition device performs the output of the recognition result provided by the first voice recognizer 3a, the voice recognition device should just display the characters on the left side of FIG. 11(b) in, for example, a lower left portion of the screen, as shown in FIG. 12.

In this case, for example, the voice recognition device can output a signal showing whether or not it is necessary to produce the display from the controller 5. Further, according to whether or not the process of outputting the recognition result provided by the first voice recognizer 3a is performed, the color of the display screen can be changed or the color of the voice recognition start commander 2 currently being displayed on the screen can be changed. As a result, the voice recognition device makes it possible for the speaking person to promptly know whether or not the output of the recognition result provided by the first voice recognizer 3a that performs voice recognition at all times is at rest, thereby improving the convenience.

Figure 13:
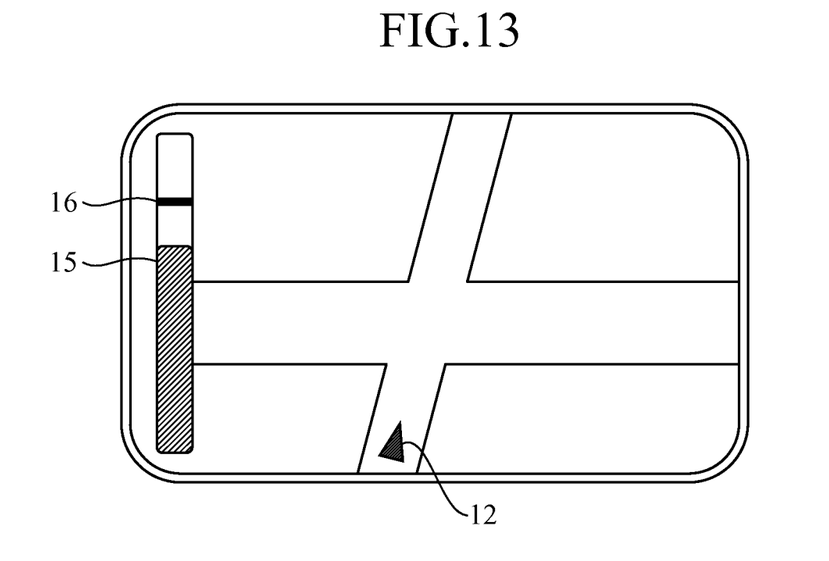
FIG. 13 is a diagram showing an example in which a noise sound volume is displayed visually on a typical navigation screen.

Further, in above-mentioned Embodiment 4, the noise sound volume 15 and the predetermined value (threshold for the noise sound volume) 16 can be displayed visually on the display unit, as shown in FIG. 13. In FIG. 13, the sound volume 15 of noise currently occurring in the surroundings of the voice recognition device and the predetermined value 16 for specifying whether or not the noise sound volume exceeds the predetermined value 16 are superimposed and displayed in a typical navigation screen in which the vehicle mark 12 showing the position of the vehicle is displayed on a map. As a result, the voice recognition device makes it possible for the speaking person to visually grasp, from the noise sound volume, whether or not the output of the recognition result provided by the first voice recognizer 3a that performs voice recognition at all times is at rest, thereby improving the convenience.

In addition, after displaying a picture, characters, or the like 14 showing whether or not the voice recognition device is in the state in which the voice recognition device performs the output of the recognition result provided by the first voice recognizer 3a, as shown in FIG. 12, the voice recognition device can display the noise sound volume 15 and the predetermined value (threshold for the noise sound volume) 16 as shown in FIG. 13. As a result, the voice recognition device makes it possible for the speaking person to promptly and visually grasp whether or not the output of the recognition result provided by the first voice recognizer 3a that performs voice recognition at all times is at rest, including that the reason for that is because the noise sound volume is large (or small), thereby further improving the convenience.

Although the explanation is made in the above embodiments by assuming that the voice recognition device in accordance with the present invention is applied to a navigation device mounted in a moving object, such as a vehicle, the navigation device to which the voice recognition device is applied is not limited to a one used for a vehicle. The voice recognition device can also be applied to any types of systems, such as a navigation device used for a moving object including a person, a vehicle, a railroad, a ship, an airplane, or the like, and a navigation system or the like which is installed in a smart phone, a tablet PC, a mobile phone, or the like.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The voice recognition device in accordance with the present invention can be applied to a navigation device mounted in a moving object, such as a vehicle, a navigation system installed in a smart phone, a tablet PC, a mobile phone, or the like, and so on.

EXPLANATIONS OF REFERENCE NUMERALS 1 voice acquiring unit, 2 voice recognition start commander, 3 voice recognizer, 3a first voice recognizer, 3b second voice recognizer, 4 voice recognition dictionary, 5 controller, 6 navigation unit, 7 screen information acquiring unit (surrounding state acquirer), 8 screen information storage unit, 9 travelling state acquiring unit (surrounding state acquirer), 10, 20, 30, 40 voice recognition device, 11 noise acquiring unit (surrounding state acquirer), 12 vehicle mark, 13 namelist, 14 picture, characters, or the like showing whether or not the voice recognition device is in a state in which the voice recognition device performs output of a recognition result provided by the first voice recognizer 3a, 15 noise sound volume, 16 predetermined value (threshold for noise sound volume).

The invention claimed is:

1. A voice recognition device that recognizes an uttered voice, said voice recognition device comprising:
- a voice acquirer that detects and acquires said uttered voice;
- a first voice recognizer that recognizes voice data acquired by said voice acquirer at all times even if the voice recognition device does not receive a voice recognition start command provided by a speaking person;
- a voice recognition start commander that outputs a command signal for starting voice recognition;
- a second voice recognizer that, when receiving the signal outputted by said voice recognition start commander, recognizes the voice data acquired by said voice acquirer; and
- a controller that acquires and outputs a recognition result provided by said first voice recognizer or said second voice recognizer, wherein said controller acquires the recognition result provided by said first voice recognizer, and, when not receiving the signal outputted by said voice recognition start commander, outputs the recognition result provided by said first voice recognizer to a device to which said voice recognition device is applied, whereas when receiving the signal outputted by said voice recognition start commander, acquires the recognition result provided by said second voice recognizer, and outputs the recognition result provided by said second voice recognizer while giving a higher priority to the recognition result provided by said second voice recognizer than to the recognition result provided by said first voice recognizer.

2. The voice recognition device according to claim 1, wherein said voice recognition device further includes a surrounding state acquirer that acquires a surrounding state, and said controller determines whether or not to output the recognition result provided by said first voice recognizer on a basis of the surrounding state acquired by said surrounding state acquirer.

3. The voice recognition device according to claim 2, wherein said surrounding state is information about a type of a screen displayed on a display of a device to which said voice recognition device is applied, and wherein said controller does not output the recognition result provided by said first voice recognizer when determining, on a basis of the information about the type of said screen, that said screen is a one to which a type causing adoption of the recognition result provided by said second voice recognizer is assigned.

4. The voice recognition device according to claim 2, wherein said surrounding state is information about a type of a function which is performed by a device to which said voice recognition device is applied, and wherein said controller does not output the recognition result provided by said first voice recognizer when determining, on a basis of the information about the type of said function, that said function is a one to which a type causing adoption of the recognition result provided by said second voice recognizer is assigned.

5. The voice recognition device according to claim 2, wherein said voice recognition device is mounted in a moving object and said surrounding state is a travelling state of said moving object, and wherein said controller does not output the recognition result provided by said first voice recognizer when determining, on a basis of the travelling state of said moving object, that said moving object is accelerating or moving at a high speed.

6. The voice recognition device according to claim 2, wherein said surrounding state is a sound volume of noise occurring in surroundings of said voice recognition device, and wherein said controller does not output the recognition result provided by said first voice recognizer when said noise sound volume is equal to or larger than a predetermined value.

7. The voice recognition device according to claim 6, wherein said controller visually displays the noise sound volume acquired by said surrounding state acquirer on a display of a device to which said voice recognition device is applied.

8. The voice recognition device according to claim 2, wherein said controller displays whether or not said controller is in a state in which said controller does not output the recognition result provided by said first voice recognizer on a display of a device to which said voice recognition device is applied.

* * * * *